(12) United States Patent  (10) Patent No.: US 6,695,082 B2
Bitsche et al.                (45) Date of Patent:     Feb. 24, 2004

(54) VEHICLE HAVING AN ELECTRICAL MACHINE OPTIONALLY COUPLING WITH A TRANSMISSION INPUT SHAFT OR OUTPUT SHAFT

(75) Inventors: Otmar Bitsche, Stuttgart (DE); Karl-Ernst Noreikat, Esslingen (DE); Tobias Ostertag, Esslingen (DE); Alfons Rennefeld, Stuttgart (DE); Wolfgang Schwienbacher, Moessingen (DE); Sven Stephan, Bleicherode (DE); Lars Weinschenker, Salach (DE)

(73) Assignee: DaimlerChrysler AG, Stuttgart (DE)

( * ) Notice: Subject to any disclaimer, the term of this patent is extended or adjusted under 35 U.S.C. 154(b) by 25 days.

(21) Appl. No.: 09/982,999

(22) Filed: Oct. 22, 2001

(65) Prior Publication Data
    US 2002/0053475 A1 May 9, 2002

(30) Foreign Application Priority Data
    Oct. 21, 2000 (DE) .......................... 100 52 231

(51) Int. Cl.$^7$ ................ F02N 11/04; B60K 1/04
(52) U.S. Cl. ................ 180/65.2; 477/3; 123/179.28
(58) Field of Search ............ 180/65.2, 65.3, 180/65.6, 65.7; 477/3; 74/665 A, 665 B; 123/179.28, 179.29, 179.25

(56) References Cited
    U.S. PATENT DOCUMENTS 4,862,009 A * 8/1989 King ................. 290/22
    5,418,400 A * 5/1995 Stockton ............. 290/46
    5,786,640 A * 7/1998 Sakai et al. ......... 290/17
    6,008,545 A * 12/1999 Nagano et al. ........ 290/46
    6,148,784 A * 11/2000 Masberg et al. ....... 123/192.1
    6,250,270 B1 * 6/2001 Ahner et al. ......... 123/179.3
    6,371,877 B1 * 4/2002 Schroeder et al. ..... 475/5
    6,394,924 B1 * 5/2002 Schiebold et al. ..... 475/5
    6,424,065 B1 * 7/2002 Vlemmings et al. ..... 310/89
    6,432,023 B1 * 8/2002 Ahner et al. ......... 477/5
    6,488,608 B2 * 12/2002 Yamaguchi et al. ..... 477/3
    2002/0117860 A1 * 8/2002 Man et al. ........... 290/46
    2002/0125861 A1 * 9/2002 Ebel et al. .......... 322/4

FOREIGN PATENT DOCUMENTS

DE        198 49 051 C1       6/2000

* cited by examiner

*Primary Examiner*—Brian L. Johnson
*Assistant Examiner*—Jeffrey Restifo
(74) *Attorney, Agent, or Firm*—Crowell & Moring LLP

(57) ABSTRACT

A vehicle having a transmission for transmitting a torque from a drive machine to drive wheels, with the transmission having a transmission output shaft and a transmission input shaft, in which the torque can be transmitted from the drive machine to the transmission output shaft, and having an electrical machine which has a rotor and a stator, with means being provided in order to connect the electric-motor torque of the electrical machine optionally to the transmission input shaft or to the transmission output shaft.

16 Claims, 4 Drawing Sheets

VEHICLE HAVING AN ELECTRICAL MACHINE OPTIONALLY COUPLING WITH A TRANSMISSION INPUT SHAFT OR OUTPUT SHAFT

BACKGROUND AND SUMMARY OF THE INVENTION

The invention relates to a vehicle having a transmission for transmitting a torque from a drive machine to drive wheels, with the transmission having a transmission output shaft and a transmission input shaft in which the torque can be transmitted from the drive machine to the transmission output shaft, and having an electrical machine which has a rotor and a stator.

A vehicle having a starter/generator system for starting an internal combustion engine is known from DE 198 49 051 C1. In this case, an electrical machine is arranged between an internal combustion engine and a transmission. One problem is that the starter/generator cannot be used to drive the vehicle. Normally, two electrical machines are provided when both starter/generator functions and hybrid functions are intended to be provided in the vehicle.

The invention is based on the object of specifying a vehicle which has an electrical machine which can be used both as a starter/generator and as a hybrid drive.

This object is achieved by a vehicle having a transmission for transmitting a torque from a drive machine to drive wheels, with the transmission having a transmission output shaft and a transmission input shaft in which the torque can be transmitted from the drive machine to the transmission output shaft, and having an electrical machine which has a rotor and a stator. Mechanisms are provided in order to connect the electric-motor torque of the first electrical machine optionally to the transmission input shaft or to the transmission output shaft.

According to the invention, the vehicle has means in order to connect the electric-motor torque of an electrical machine optionally to the transmission input shaft or to the transmission output shaft. The torque is preferably transmitted with different transmission ratios to the transmission input shaft and to the transmission output shaft. The advantage is that only a single electrical machine is required for starter/generator and hybrid functions. The machine can be designed for different requirements by means of transmission ratios which can be chosen freely. In addition to the known advantages of a parallel hybrid, a starter/generator function is also provided in the vehicle according to the invention.

It is self-evident that the features mentioned above and which are also explained in the following text can be used not only in the respectively stated combination but also in other combinations or on their own, without having to depart from the scope of the present invention.

Further advantages and refinements of the invention will become evident from the other claims and from the description.

BRIEF DESCRIPTION OF THE DRAWINGS

The invention is described in more detail in the following text with reference to a drawing, in which the figures show.

DETAILED DESCRIPTION OF THE DRAWINGS

The invention will be explained in the following text with reference to an arrangement having a manual transmission. However, the invention can also be used in vehicles having automatic transmissions.

Figure 1:
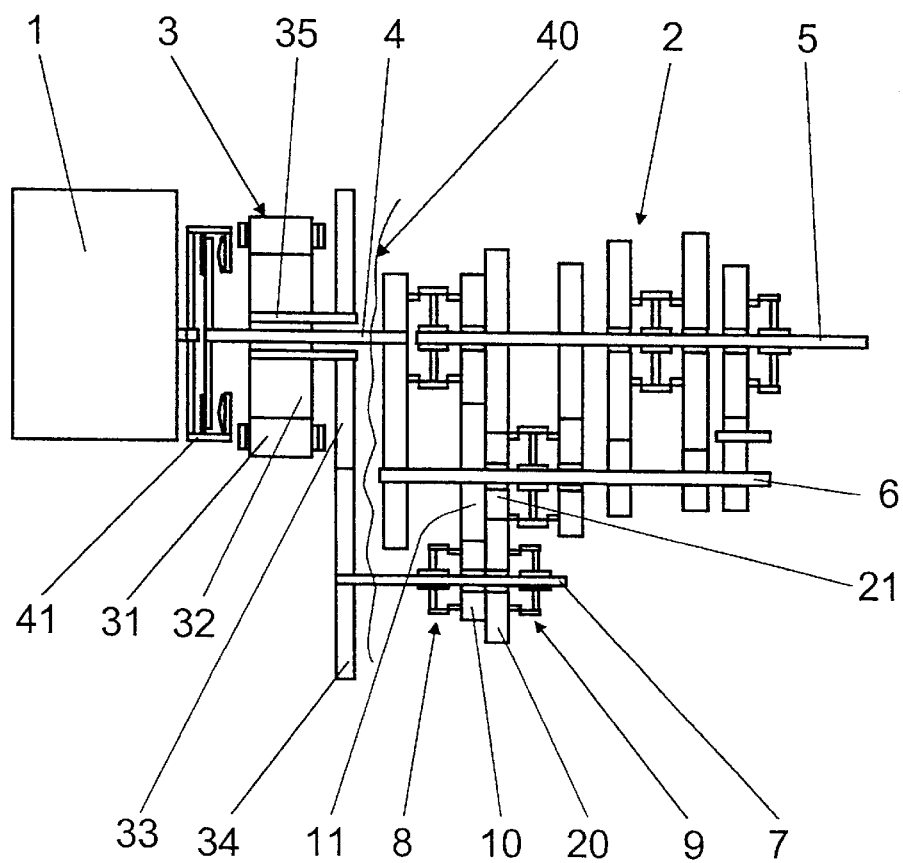
FIG. 1 shows an outline illustration of one preferred arrangement with a manual transmission.

FIG. 1 shows a detail from the drive train of a vehicle according to the invention having a transmission 2. For the sake of clarity, the illustration shows an additional shaft in the transmission, stressed in an idealized manner such that the illustration acts like a side view. The additional shaft is folded downwards with respect to the actual arrangement.

The manual transmission 2 is provided to transmit a torque from a drive machine 1, such as an internal combustion engine, to drive wheels (not shown). The transmission 2 has a transmission output shaft 5 and a transmission input shaft 4. The torque from the drive machine 1 is transmitted to the transmission input shaft 4, and from there to the transmission output shaft 5. A layshaft 6 is provided for this purpose and is provided, in the normal manner, with gearwheels, while gear-changing and synchronization means are provided, in order to select between different gearwheels with different transmission ratios, in the normal manner. The torque can thus be transmitted from the drive machine 1 with different transmission ratios via the transmission 2 to the drive wheels.

Furthermore, an electrical machine 3 is arranged between the drive machine 1 and the transmission 2, and has a rotor 32 and a stator 31. The electrical machine 3 is preferably in the form of an internal rotor machine. However, an external rotor arrangement may also be used.

Means 35, 33, 34, 7, 8, 9, 10, 20 are provided in order to connect an electric-motor torque from the electrical machine 3 optionally either to the transmission input shaft 4 or to the transmission output shaft 5. The electrical machine 3 is operated as a starter/generator when its torque is transmitted to the transmission input shaft 4.

If the torque is transmitted to the transmission output shaft 5, the electrical machine 3 acts as a further drive machine, which can drive the vehicle instead of or in addition to the drive machine 1.

The particular advantage is that, in consequence, the same electrical machine can be used for two different purposes. Only one electrical machine is thus required in order to provide a starter/generator mode for a vehicle and to drive it as a parallel hybrid. The possible method of operation of the electrical machine 3 depends essentially only on its physical length.

The rotor 32 of the electrical machine 3 is held by a rotor holder 35. The rotor 32 coaxially surrounds the rotor holder 35, which surrounds the transmission input shaft 4. The rotor is connected in a rotationally fixed manner to a third gearwheel 33. This is operatively connected to a fourth gearwheel 34, which is connected in a rotationally fixed manner to an additional shaft 7. When the rotor 32 rotates, the third gearwheel 33 rotates with it and engages with the fourth gearwheel 34. In consequence, the additional intermediate shaft 7 is driven.

The additional intermediate shaft 7 has a first gearwheel 10 and a second gearwheel 20. The layshaft 6 has gearwheels 11, 21 associated in a corresponding manner with these gearwheels 10, 20. When the first gearwheel 10 on the additional intermediate shaft 7 interacts with the first gearwheel 11 on the layshaft 6, the torque from the electrical machine 3 is transmitted to the transmission input shaft 4. The rotating electrical machine 3 can thus overcome the breakaway torque of the drive machine 1, when the clutch 41 is engaged, thus starting this drive machine 1 from rest.

When the second gearwheel 20 on the additional intermediate shaft 7 interacts with the second gearwheel 21 on the layshaft 6, the torque of the electrical machine 3 is transmitted to the transmission output shaft 5, and the electrical machine 3 can be used to drive the vehicle. This corresponds to a parallel hybrid. In this case, it is advantageous that the electrical machines 3 that are used can be designed advantageously for different requirements since the transmission ratios of the gearwheels 10, 11, 20, 21 can be selected freely.

Thus, for example, a transmission ratio i of i=2:1 can be selected for the first gearwheels 10, 11 during starting, and a transmission ratio of i=1:1 can be selected for the second gearwheels 20, 21 for driving. This results in a considerable improvement in the efficiency of the electrical machine 3.

In order to transmit the electric-motor torque of the electrical machine 3 from the additional intermediate shaft 7 to the transmission input shaft 4, the first gearwheel 10 is operatively connected to the first gearwheel 11 on the layshaft 6, by a first gear-changing and synchronization means 8 synchronizing the two gearwheels 10, 11, and operatively connecting them.

In order to transmit the electric-motor torque of the electrical machine 3 from the additional intermediate shaft 7 to the transmission output shaft 4, the second gearwheel 20 is operatively connected to the second gearwheel 21 on the layshaft 6, by a second gear-changing and synchronization means 9 synchronizing the two gearwheels 20, 21 and operatively connecting them.

In the case of an automatic transmission, preferably with an automatic gear-changing and starting clutch 41, the preferred solution also allows gear changing under load.

Instead of a manual transmission as the transmission 2, an automatic transmission can also be used, in which case the torque of the electrical machine 3 can be switched backwards and forwards between the transmission input shaft 3 and the transmission output shaft 5 by means of epicyclic gearing.

One advantageous factor is that vehicles with transmissions normally intrinsically have virtually sufficient physical space to provide, for example, an additional intermediate shaft 7 and/or an electrical machine 3. If necessary, the transmission 2 or the transmission bellhousing 40 must be lengthened somewhat, depending on the design of the electrical machine 3. The solution according to the invention allows very compact integration of an electrical machine in the vehicle according to the invention, without having to provide any complex structures.

The electrical machine 3 is preferably arranged between the drive engine 1 and the transmission bellhousing 40. The electrical machine 3 can also be arranged inside the transmission bellhousing 40. It is also possible to provide the transmission 2 between the drive machine 1 and the electrical machine 3. In consequence, an advantageous physical area can be used for different electrical machines.

Figure 2:
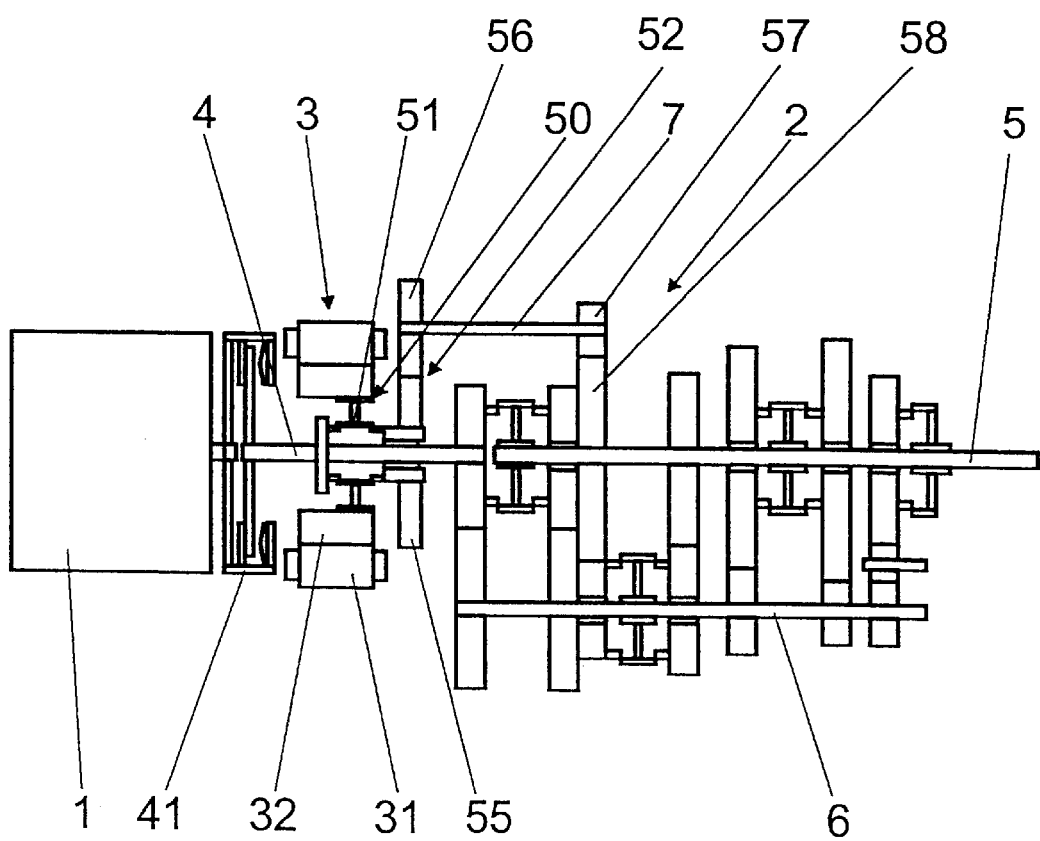
FIG. 2 shows an outline illustration of an alternative arrangement to that in FIG. 1.
Figure 3:
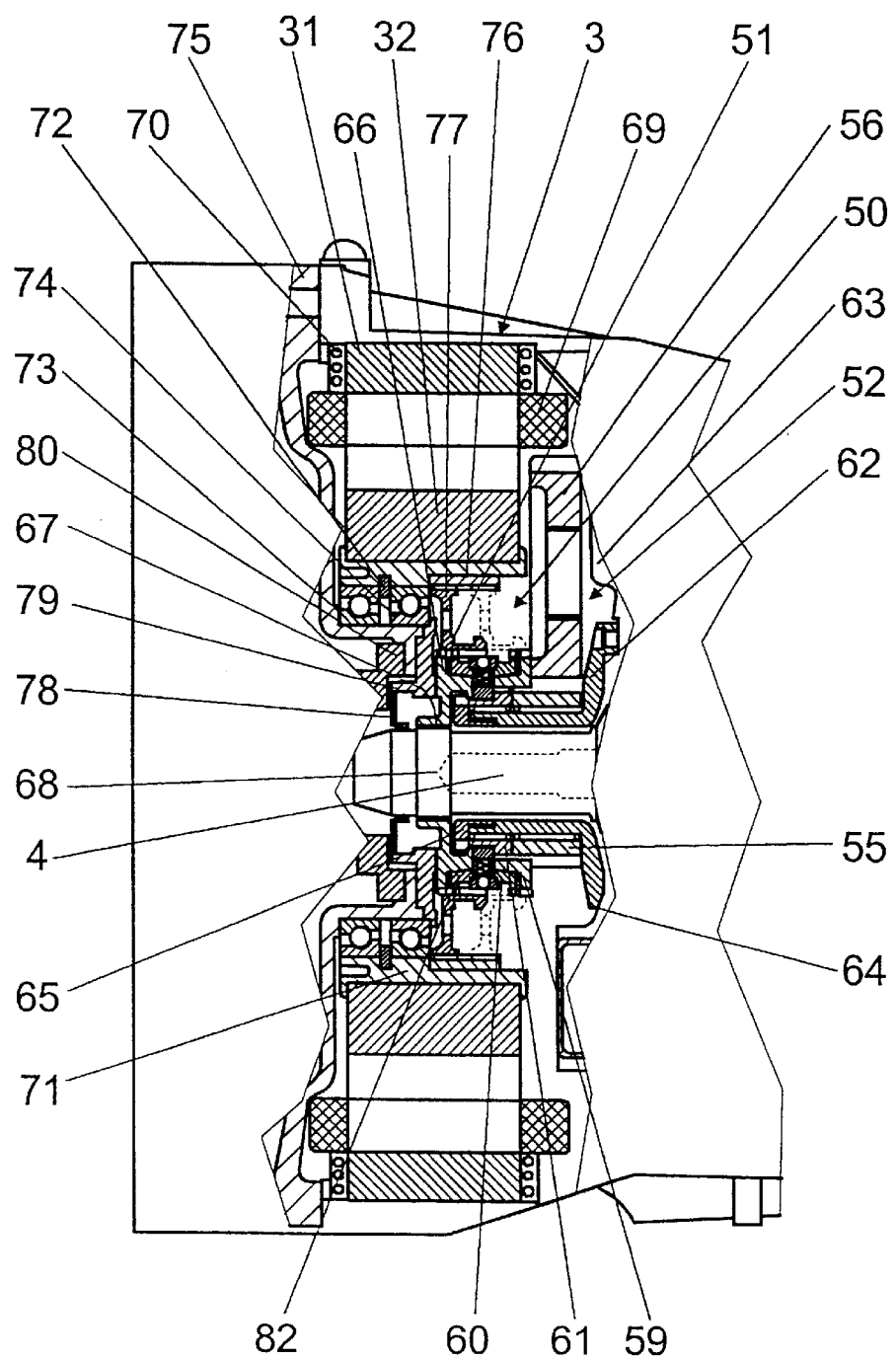
FIG. 3 shows a partial longitudinal section through a manual transmission as shown in FIG. 2.
Figure 4:
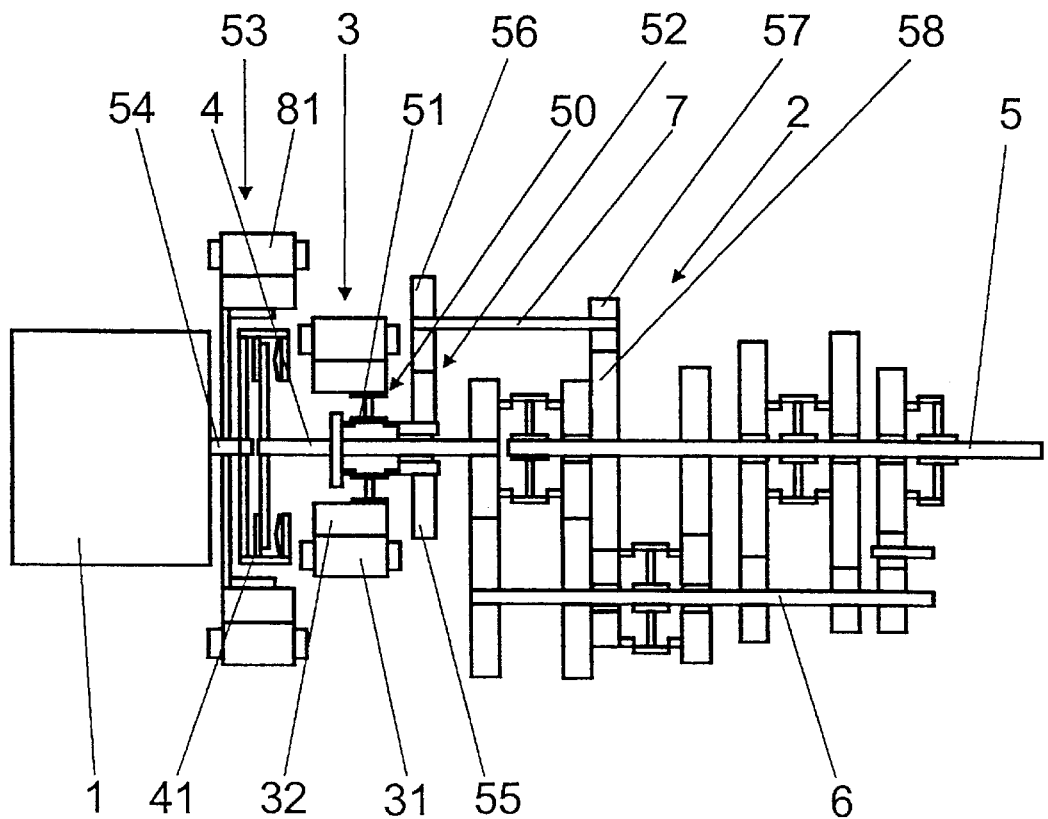
FIG. 4 shows an outline illustration of an alternative arrangement to that shown in FIG. 2 with a second electrical machine.

FIGS. 2 and 3 as well as FIG. 4 show alternative arrangements to those shown in FIG. 1. Components which essentially remain the same are in principle still annotated with the same reference symbols. Furthermore, reference can be made to the description of the exemplary embodiment relating to FIG. 1 for features and functions which remain the same.

The following description is restricted essentially to the differences from the exemplary embodiment in FIG. 1.

In the arrangement shown in FIG. 2, a gear-changing and synchronization means 50 and an electrical machine 3 are arranged such that they intersect in the axial direction, or the gear-changing and synchronization means 50 are arranged radially inside a rotor 32 of the electrical machine 3. The utilization of the space inside the rotor 32 results in a particularly compact design.

The electrical machine 3 and the gear-changing and synchronization means 50 surround a transmission input shaft 4. The electrical machine 3 can be coupled directly to the transmission input shaft 4 via the gear-changing and synchronization means 50, to be precise by pushing a sliding collar 51 of the gear-changing and synchronization means 50 over an actuator, which is not shown in any more detail, in the direction of a gear-changing clutch 41 for the transmission 2. This results in a short connection, via a small number of different components, between the drive machine 1 and the electrical machine 3 and hence in high efficiency, particularly when the electrical machine 3 is being used to start the drive machine 1.

The electrical machine 3 can furthermore be coupled via the gear-changing and synchronization means 50 and via a pair of gearwheels 52 to an additional intermediate shaft 7. The pair of gearwheels 52 has a loose wheel 55 mounted on a transmission flange 62 and a fixed wheel 56 mounted on an additional intermediate shaft 7 (see FIGS. 2 and 3, FIG. 2 shows the arrangement without the transmission flange 62).

The intermediate shaft 7 is connected via a fixed wheel 57, which is mounted on the intermediate shaft 7, to a fixed wheel 58 which is mounted on a transmission output shaft 5.

In order to couple the electrical machine 3 to the intermediate shaft 7, and hence to the transmission output shaft 5, the sliding collar 51 of the gear-changing and synchronization means 50 is pushed over the actuator, in the direction facing away from the gear-changing clutch 41. The two possible selection positions of the gear-changing and synchronization means 50 thus mean that a gear-changing and synchronization means, and hence space and weight, can be saved in comparison to the arrangement shown in FIG. 1.

In order to start the drive machine 1 and to operate the generator when the vehicle is stationary, and for generator operation and recuperation operation, that is to say to convert kinetic energy to electrical energy during braking, the electrical machine 3 is coupled via the gear-changing and synchronization means 50 directly to the transmission input shaft 4 when travelling at speeds above 140 km/h. For generator operation and for recuperation operation when travelling at speeds below 140 km/h and in order to drive the vehicle electrically, to assist the drive machine 1 and/or for boosting and load changing, that is to say changing over to drive the vehicle electrically during a gear-changing process, the electrical machine 1 is connected to the intermediate shaft 7 via the gear-changing and synchronization means 50 and via the pair of gearwheels 52.

The loose wheel 55, a clutch body 59 facing away from the gear-changing clutch 41, a synchronization ring 60 associated with the clutch body 59 and a base body 61 of the gear-changing and synchronization means 50 are mounted on the transmission flange 62 (FIGS. 2 and 3). The transmission flange 62 is screwed to a transmission housing 63 on the side facing away from the gear-changing clutch 41. The transmission flange 62 has cutouts 64 in its external diameter on the side facing away from the gear-changing clutch 41, in order to avoid any influence from the physical shape of the transmission housing 63 and from the space of the intermediate shaft 7 and of a layshaft 6. The pair of gearwheels 52 and the electrical machine 3 are arranged such that they intersect in the axial direction, or the pair of gearwheels 52 is arranged radially inside a coil core 69 of the electrical machine 3, thus resulting in a compact design.

The transmission flange 62 is designed to have a roller running surface in an accommodation area for the loose wheel 55 and the base body 61. Furthermore, the insides of the components 55, 61 which are on bearings are designed with roller running surfaces. The loose wheel 55 has helical teeth and produces axial forces during operation. If axial forces occur in the direction facing away from the gear-changing clutch 41 during operation, these are supported on the transmission flange 62, to be precise via very finely machined abutting surfaces. If axial forces in the direction of the gear-changing clutch 41 occur during operation, these are supported via the base body 61, which has needle bearings, on an abutting sleeve 65 screwed into the transmission flange 62. The abutting sleeve 65 has an external thread which is screwed into an internal thread in the transmission flange 62, which is in the form of a sleeve. The abutting surfaces are lubricated with oil, which is applied to the abutting surfaces by means of a lubricant supply.

If the abutting sleeve 65 is screwed into the transmission flange 62 during assembly, the sliding collar 51, a clutch body 66 facing the gear-changing clutch 41 and a synchronization ring 82 can be fitted. The clutch body 66 has an internal tooth system 67 which engages in an external tooth system 68 on the transmission input shaft 4, and is connected to it in a rotationally fixed manner.

A stator 31 and cooling rings 70 for the electrical machine 3 are pressed into the transmission housing 63 with a force fit. The rotor 32 of the electrical machine 3 is mounted on a rotor support 71, via which rotor laminates of the rotor 32 are braced via extensions at the side. A locking ring 72 is arranged in an annular groove on the inner circumference of the rotor support 71, which is in the form of a sleeve, for axial positioning of the rotor support 71. The rotor support 71 is mounted in an O-arrangement on a retaining flange 75 via two angled-contact ball bearings 73, 74, which are arranged in a row and are slightly prestressed, thus providing a stiff bearing for the rotor 31 with a small bearing width. The locking ring 72 is clamped in between outer rings of the angled-contact ball bearings 73, 74, by which means it, the rotor support 71 and the rotor 31 are fixed in the axial direction. The lubricant supply to the abutting surfaces of the gear-changing and synchronization means 50 ensures an adequate supply to the bearing for the rotor 31 and for the rotor support 71.

The retaining flange 75 is screwed on its outer circumference to the transmission housing 63 by means of screws which are not illustrated in any more detail, and forms a separating wall between the transmission 2 and the gear-changing clutch 41. Sealing for the oil-lubricated transmission space from the clutch space is ensured by a radial shaft sealing ring 78. The radial shaft sealing ring 78 is integrated in an abutting disc 79, thus resulting in an axially compact design. The abutting disc 79 is furthermore used to prestress the angled-contact ball bearings 73, 74. The abutting disc 79 is screwed into the retaining flange 75, to be precise from the outside, while a central disengaging device 80 is being fitted. Axial forces, when the central disengaging device 80 is in the selection state, in the direction of the transmission 2 are supported via the retaining flange 75 and via the abutting disc 79, the clutch body 66, the base body 61, the loose wheel 55 and via the transmission flange 62 on the transmission housing 63.

A hollow ring 76 with an internal tooth system is pressed in a force-fitting manner onto the internal circumference of the rotor support 71, and engages with an external tooth system on a ring 77 which is integrally formed on the sliding collar 51.

A second electrical machine 53 is provided, in addition to a first electrical machine 3, in the arrangement shown in FIG. 4, and its rotor 81 is connected in a rotationally fixed manner to an output shaft 54, or to a crankshaft, of a drive machine 1, and is used as a flywheel mass for the drive machine 1.

The two electrical machines 3, 53 are separated by a torsional oscillation damper, which is not shown in any more detail, and by a gear-changing clutch 41.

The second electrical machine 53 allows the drive machine 1 to be started in a particularly short time while the vehicle is being driven via the first electrical machine 3, without any need to switch over the first electrical machine 3. The drive machine 1 can be switched off while the vehicle is being driven by the first electrical machine 3, although the maximum power is nevertheless available on short notice. Furthermore, the second electrical machine 53 can be used to drive the vehicle, for boosting, for recuperation and for generator operation. The second electrical machine 53 and the gear-changing clutch 41 as well as the torsional oscillation damper intersect in the axial direction, or the gear-changing clutch 41 and the torsional oscillation damper are arranged radially inside the second electrical machine 53, thus resulting in an axially compact design.

What is claimed is:

1. Vehicle, comprising:
    a transmission for transmitting a torque from a drive machine to drive wheels, said transmission having a transmission output shaft and a transmission input shaft, in which the torque can be transmitted from the drive machine to the transmission output shaft;
    an electrical machine which has a rotor and a stator; and
    means for connecting an electric-motor torque of the electrical machine optionally to the transmission input shaft or to the transmission output shaft,
    wherein the transmission is a manual transmission, and
    wherein said means comprises a layshaft of the manual transmission and an additional intermediate shaft in the manual transmission interacting with the layshaft and, further wherein at least one first or second gearwheel on the layshaft is operatively connected to at least one associated first or second gearwheel on the additional intermediate shaft.

2. Vehicle according to claim 1, wherein the additional intermediate shaft is connected to the rotor of the electrical machine and can be driven by the rotor.

3. Vehicle according to claim 1, wherein said means further comprises a first gear-changing and synchronzation device associated with the additional intermediate shaft which synchronizes and operatively connects the first gearwheel on the intermediate shaft to the first gearwheel on the layshaft in order to transmit the electric-motor torque of the electrical machine from the additional intermediate shaft to the transmission input shaft.

4. Vehicle according to claim 3, wherein said means further comprises a second gear-changing and synchronization device associated with the additional intermediate shaft which synchronizes and operatively connects the second gearwheel on the intermediate shaft to the second gearwheel on the layshaft in order to transmit the electric-motor torque of the electrical machine from the additional intermediate shaft to the transmission output shaft.

5. Vehicle according to claim 1, wherein the rotor of the electrical machine is connected to a rotor holder, which is connected in a rotationally fixed manner to a third gearwheel which is operatively connected to a fourth gearwheel, which is connected in a rotationally fixed manner to the additional intermediate shaft.

6. Vehicle according to claim 1, wherein a pair of gearwheels are arranged such that they at least partially intersect in the axial direction in order to transmit a torque between the electrical machine and the additional intermediate shaft and the electrical machine.

7. Vehicle according to claim 1, wherein the electrical machine is useable as a starter/generator when the first gearwheel on the additional intermediate shaft interacts with the first gearwheel on the layshaft, and is useable as a further drive machine when the second gearwheel on the additional intermediate shaft interacts with the second gearwheel on the layshaft.

8. A vehicle, comprising:
   a drive machine;
   a transmission operatively coupled to transmit torque from the drive machine, the transmission having a transmission output shaft and a transmission input shaft, the torque from the drive machine being transmittable to the transmission output shaft;
   an electrical machine having a rotor and a stator, said electrical machine producing an electric motor torque optionally connectable to the transmission input shaft or the transmission output shaft,
   wherein the transmission is a manual transmission, and
   wherein the manual transmission further comprises a lay shaft and an intermediate shaft, first and second gear wheels being arranged on the lay shaft so as to be operatively associated with corresponding first and second gear wheels on the intermediate shaft, wherein one of said first and second gear wheels on the lay shaft being operatively coupled to a corresponding one of said first and second gear wheels on the intermediate shaft.

9. The vehicle according to claim 8, wherein the intermediate shaft is connected to the rotor of the electrical machine.

10. The vehicle according to claim 8, further comprising a first gear-changing and synchronization device operatively associated with the intermediate shaft, said first gear-changing and synchronization device operatively connecting the first gear wheel on the intermediate shaft to the first gear wheel on the lay shaft in order to transmit the electric-motor torque of the electrical machine from the intermediate shaft to the transmission input shaft.

11. The vehicle according to claim 10, further comprising a second gear-changing and synchronization device operatively associated with the intermediate shaft, said second gear-changing and synchronization device operatively connecting the second gear wheel of the intermediate shaft to the second gear wheel of the lay shaft in order to transmit the electric-motor torque of the electrical machine from the intermediate shaft to the transmission output shaft.

12. The vehicle according to claim 8, further comprising a second gear-changing and synchronization device operatively associated with the intermediate shaft, said second gear-changing and synchronization device operatively connecting the second gear wheel on the intermediate shaft to the second gear wheel on the lay shaft in order to transmit the electric-motor torque of the electrical machine from the intermediate shaft to the transmission output shaft.

13. The vehicle according to claim 8, further comprising a gear-changing and synchronization device, wherein said electrical machine and said gear-changing and synchronization device are arranged so as to intersect one another at least partially in an axial direction of the transmission.

14. The vehicle according to claim 13, wherein the electrical machine is connectable via the gear-changing and synchronization device at least to the transmission input shaft.

15. The vehicle according to claim 8, wherein the transmission is an automatic transmission, in which the electric motor torque from the electrical machine is switchable backwards and forwards between the transmission input shaft and the transmission output shaft via epicyclic gearing.

16. The vehicle according to claim 8, further comprising a second electrical machine, said second electrical machine transmitting an electric motor torque at least to an output shaft of the drive machine.

* * * * *